United States Patent
Ogale (10) Patent No.: US 10,773,468 B2
(45) Date of Patent: Sep. 15, 2020

(54) HYBRID NON-WOVEN COMPOSITE PART

(71) Applicant: The Boeing Company, Chicago, IL (US)

(72) Inventor: Amol Ogale, Munich (DE)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/676,522

(22) Filed: Aug. 14, 2017

(65) Prior Publication Data

US 2019/0047235 A1 Feb. 14, 2019

(51) Int. Cl.
| | | |
|---|---|---|
| *B29C 70/18* | (2006.01) | |
| *B29C 70/46* | (2006.01) | |
| *B29K 71/00* | (2006.01) | |
| *B29K 307/04* | (2006.01) | |

(Continued)

(52) U.S. Cl.
CPC ............ *B29C 70/18* (2013.01); *B29C 70/465* (2013.01); *B29K 2071/00* (2013.01); *B29K 2081/04* (2013.01); *B29K 2105/0863* (2013.01); *B29K 2307/04* (2013.01)

(58) Field of Classification Search
CPC ....... B29C 70/18; B29C 70/465; B29C 70/00; B29K 2071/00; B29K 2081/04; B29K 2105/0863; B29K 2307/04; C08J 5/042; D04H 3/002; D04H 3/12; B32B 2262/106; B32B 27/12; B32B 27/285; Y10T 428/237; Y10T 428/24994; Y10T 428/239
USPC ........ 156/242; 264/136, 257; 428/297.4, 74, 428/76
See application file for complete search history.

(56) References Cited

U.S. PATENT DOCUMENTS

| | | | | | |
|---|---|---|---|---|---|
| 3,928,693 A | * | 12/1975 | Rudloff | ................... | B29C 70/00 428/74 |
| 4,380,523 A | * | 4/1983 | Lind | ....................... | C08J 5/042 264/257 |
| 5,820,801 A | * | 10/1998 | Greve | ..................... | B29B 11/16 264/86 |

FOREIGN PATENT DOCUMENTS

| | | |
|---|---|---|
| EP | 0047576 | 3/1982 |
| EP | 0640466 | 3/1995 |
| EP | 0743165 | 11/1996 |

(Continued)

OTHER PUBLICATIONS

European Search Report concerning European Patent Application No. 18175890.5 dated Dec. 21, 2018.

(Continued)

*Primary Examiner* — Camie S Thompson
(74) *Attorney, Agent, or Firm* — Kunzler Bean & Adamson (57) ABSTRACT

Disclosed herein is a method of forming a composite part. The method includes heating an unconsolidated mat including a first thermoplastic, a second thermoplastic, and reinforcing fibers to a first temperature. The first thermoplastic includes a first melting temperature and the second thermoplastic includes a second melting temperature greater than the first melting temperature. The first temperature is greater than the second melting temperature. The method includes compressing the unconsolidated mat, while heated, into a composite fiber-reinforced consolidated sheet. The method includes reheating the composite fiber-reinforced consolidated sheet to a second temperature, wherein the second temperature is above the first melting temperature and below the second melting temperature and, while reheated, forming the composite fiber-reinforced consolidated sheet into a desired shape.

20 Claims, 5 Drawing Sheets

(51) Int. Cl.
*B29K 105/08* (2006.01)
*B29K 81/00* (2006.01)

(56) References Cited

FOREIGN PATENT DOCUMENTS

| JP | H01-286824 | * | 11/1989 |
| WO | 2004048072 | | 6/2004 |

OTHER PUBLICATIONS

Communication concerning European Patent Application No. 18175890.5 dated Jan. 17, 2019.
Communication concerning European Patent Application No. 18175890.5 dated May 6, 2020.

* cited by examiner

HYBRID NON-WOVEN COMPOSITE PART

FIELD

This disclosure relates generally to thermoformed parts, and more particularly to forming a composite part with first and second thermoplastics having different melting temperatures.

BACKGROUND

The formation of parts from consolidated mats, made from co-mingled reinforcement fibers and thermoplastic filaments, includes heating the mats to a melting temperature of the thermoplastic filaments. However, the mats, including the thermoplastic filaments, have a tendency to expand and bulk up during the heating phase prior to the shaping phase. Such expansion and bulking may make closure of a part-forming mold difficult or even impossible. Additionally, expansion and bulking of the mat may result in insufficient pressure to form the part. Compensating for the insufficient pressure, by increasing the pressure applied to the part, may increase the risk of collapsing the core of the part.

SUMMARY

The subject matter of the present application has been developed in response to the present state of the art, and in particular, in response to the problems and disadvantages associated with conventional processes that have not yet been fully solved by currently available techniques. Accordingly, the subject matter of the present application has been developed to provide embodiments of a system, an apparatus, and a method that overcome at least some of the above-discussed shortcomings of prior art techniques. For example, according to one implementation, a method of forming a non-planar composite part with first and second thermoplastics having different melting temperatures is disclosed.

Disclosed herein is a method of forming a composite part. The method includes heating an unconsolidated mat including a first thermoplastic, a second thermoplastic, and reinforcing fibers to a first temperature. The first thermoplastic includes a first melting temperature and the second thermoplastic includes a second melting temperature greater than the first melting temperature. The first temperature is greater than the second melting temperature. The method includes compressing the unconsolidated mat, while heated, into a composite fiber-reinforced consolidated sheet. The method includes reheating the composite fiber-reinforced consolidated sheet to a second temperature, wherein the second temperature is above the first melting temperature and below the second melting temperature and, while reheated, forming the composite fiber-reinforced consolidated sheet into a desired shape. The preceding subject matter of this paragraph characterizes example 1 of the present disclosure.

The reinforcing fibers are carbon fibers. The preceding subject matter of this paragraph characterizes example 2 of the present disclosure, wherein example 2 also includes the subject matter according to example 1, above.

The first thermoplastic includes at least thirty percent of the composite part by volume. The preceding subject matter of this paragraph characterizes example 3 of the present disclosure, wherein example 3 also includes the subject matter according to any one of examples 1-2, above.

The second thermoplastic includes at least one percent of the composite part by volume. The preceding subject matter of this paragraph characterizes example 4 of the present disclosure, wherein example 4 also includes the subject matter according to any one of examples 1-3, above.

The reinforcing fibers include at least forty five percent of the composite part by volume. The preceding subject matter of this paragraph characterizes example 5 of the present disclosure, wherein example 5 also includes the subject matter according to any one of examples 1-4, above.

The first thermoplastic includes thermoplastic fibers prior to heating the unconsolidated mat. The preceding subject matter of this paragraph characterizes example 6 of the present disclosure, wherein example 6 also includes the subject matter according to any one of examples 1-5, above.

The second thermoplastic includes thermoplastic fibers prior to heating the unconsolidated mat. The preceding subject matter of this paragraph characterizes example 7 of the present disclosure, wherein example 7 also includes the subject matter according to any one of examples 1-6, above.

The second thermoplastic includes a thermoplastic powder prior to heating the unconsolidated mat. The preceding subject matter of this paragraph characterizes example 8 of the present disclosure, wherein example 8 also includes the subject matter according to any one of examples 1-6, above.

Forming the composite fiber-reinforced consolidated sheet into the composite part comprises a stamp forming operation. The preceding subject matter of this paragraph characterizes example 9 of the present disclosure, wherein example 9 also includes the subject matter according to any one of examples 1 and 1-8, above.

The first thermoplastic is polyphenylene sulfide (PPS) and the second thermoplastic is one of polyether ether ketone (PEEK) or polyether ketone ketone (PEKK). The preceding subject matter of this paragraph characterizes example 10 of the present disclosure, wherein example 10 also includes the subject matter according to any one of examples 1-9, above.

The desired shape is a non-planar shape. The preceding subject matter of this paragraph characterizes example 11 of the present disclosure, wherein example 11 also includes the subject matter according to any one of examples 1-10, above.

The second thermoplastic includes thermoplastic fibers, and the thermoplastic fibers are needle-punched into the first thermoplastic and reinforcing fibers. The preceding subject matter of this paragraph characterizes example 12 of the present disclosure, wherein example 12 also includes the subject matter according to any one of examples 1-11, above.

The second thermoplastic includes thermoplastic fibers, and the thermoplastic fibers are stitched into the first thermoplastic and reinforcing fibers. The preceding subject matter of this paragraph characterizes example 13 of the present disclosure, wherein example 13 also includes the subject matter according to any one of examples 1-11, above.

The second thermoplastic includes thermoplastic fibers, and the thermoplastic fibers are knitted into the first thermoplastic and reinforcing fibers. The preceding subject matter of this paragraph characterizes example 14 of the present disclosure, wherein example 14 also includes the subject matter according to any one of examples 1-11, above.

The method includes commingling the reinforcing fibers, the first thermoplastic, and the second thermoplastic in a random orientation to form the unconsolidated mat prior to heating the unconsolidated mat. The preceding subject matter of this paragraph characterizes example 15 of the present disclosure, wherein example 15 also includes the subject matter according to any one of examples 1-14, above.

Also disclosed herein is a composite part. The non-planar composite part includes randomly oriented reinforcing fibers, a first thermoplastic including a first melting temperature, and a second thermoplastic including a second melting temperature greater than the first melting temperature. The preceding subject matter of this paragraph characterizes example 16 of the present disclosure.

The first thermoplastic is polyphenylene sulfide (PPS) and the second thermoplastic is polyether ketone ketone (PEKK). The preceding subject matter of this paragraph characterizes example 17 of the present disclosure, wherein example 17 also includes the subject matter according to example 16, above.

The first thermoplastic is polyphenylene sulfide (PPS) and the second thermoplastic is polyether ether ketone (PEEK). The preceding subject matter of this paragraph characterizes example 18 of the present disclosure, wherein example 18 also includes the subject matter according to example 16, above.

The first thermoplastic includes at least thirty percent of the part by volume, the second thermoplastic includes at least one percent of the part by volume, and the reinforcing fibers include at least forty five percent of the part by volume. The preceding subject matter of this paragraph characterizes example 19 of the present disclosure, wherein example 19 also includes the subject matter according to any one of examples 16-18, above.

Further disclosed herein is a method of forming a consolidated mat. The method includes commingling, with a first thermoplastic and reinforcing fibers, a second thermoplastic to form an unconsolidated mat. The first thermoplastic includes a first melting temperature and the second thermoplastic includes a second melting temperature greater than the first melting temperature. The method includes heating the unconsolidated mat to a first temperature, wherein the first temperature is greater than the second melting temperature. The method includes while heated, compressing the unconsolidated mat into a composite fiber reinforced consolidated mat. The second thermoplastic includes between one percent and five percent of the part by volume. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Thermoformed structures or parts are structures formed by heating thermoplastic materials, such as planar sheets, up to a pliable forming temperature or above the melting temperature of the thermoplastic material and then applying a forming tool (such as a mold or stamping tool) to form the planar sheets of thermoplastic materials into more complex shapes. The process is relatively straightforward when utilizing a single thermoplastic material.

In recent years, many applications have utilized composite fiber-reinforced thermoplastics. The reinforcing fibers reinforce the thermoplastic providing enhanced physical properties in many applications. In order for the reinforcing fibers to impregnate or intermix with the thermoplastic, the reinforcing fibers are commingled or intermixed with thermoplastic filaments, fibers, pellets, or powders and are formed into planar sheets. The planar sheets are compressed while they are heated so as to consolidate the thermoplastic material and decrease voids, which results in a compressed form for the planar sheets. The planar sheets are relatively easy to form as consistent pressure and heat can be applied to the composite fiber-reinforced thermoplastic.

The consolidated sheets can be shaped by more complex forming tools (such as a stamping tool or mold) to form more complex shapes and structures. The composite fiber-reinforced consolidated sheets are again heated to a pliable forming temperature or above the melting temperature of the thermoplastic material and shaped, under pressure, to the complex shapes of the forming tool. Unfortunately, in this second heating process, the composite fiber-reinforced consolidated sheets are subject to various complications. As the composite fiber-reinforced consolidated sheets are reheated, the thermoplastic material expands and the composite fiber-reinforced consolidated sheets are subject to bulking or non-uniform expansion prior to part formation in a forming operation, such as, for example, a stamping operation where the sheet is stamped into shape. According to one example, the bulking and expansion may create difficulty in closing a mold or insufficient pressure to form the final structure. By necessitating higher pressures, manufacturing costs are increased and in the case of sandwich structures, which utilize a plurality of stacked sheets, core collapse may occur.

Embodiments described herein provide solutions to the problems described above. In one example, two thermoplastic materials having different melting temperatures are utilized in the composite fiber-reinforced consolidated sheets. With different melting temperatures, if the composite fiber-reinforced consolidated sheets are reheated to a temperature above the melting temperature of the first thermoplastic material but below the melting temperature of the second thermoplastic material, only the first thermoplastic material will be subject to bulking and expansion. The second thermoplastic material will not reach a temperature sufficient to induce the bulking and expansion. With the second thermoplastic material distributed in the composite fiber-reinforced consolidated sheets, the physical properties of the second thermoplastic material, such as its tensile strength, will combat or restrict the bulking of the first thermoplastic material.

With a sufficient amount of the first thermoplastic material, the composite fiber-reinforced consolidated sheets will be pliable and able to be formed into a planar or non-planar shape dictated by the forming tool. With a sufficient amount of the second thermoplastic material distributed within the composite fiber-reinforced consolidated sheets, the physical properties of the second thermoplastic material will counter or restrict the bulking and expansion of the first thermoplastic material.

Figure 1:
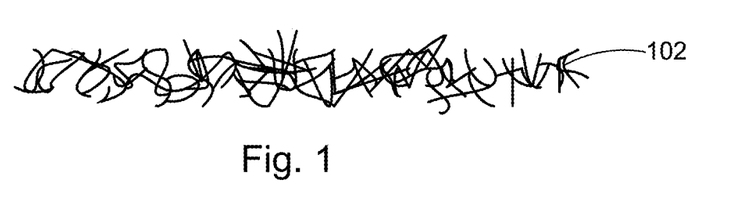
FIG. 1 is a cross section of randomly oriented reinforcing fibers, according to one or more embodiments of the present disclosure.
Figure 2:
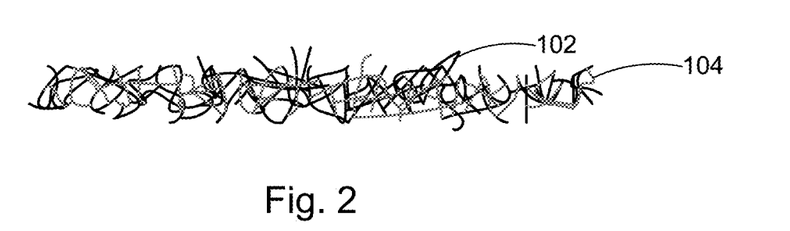
FIG. 2 is a cross section of randomly oriented reinforcing fibers and a thermoplastic fibers of a first thermoplastic, according to one or more embodiments of the present disclosure.
Figure 3:
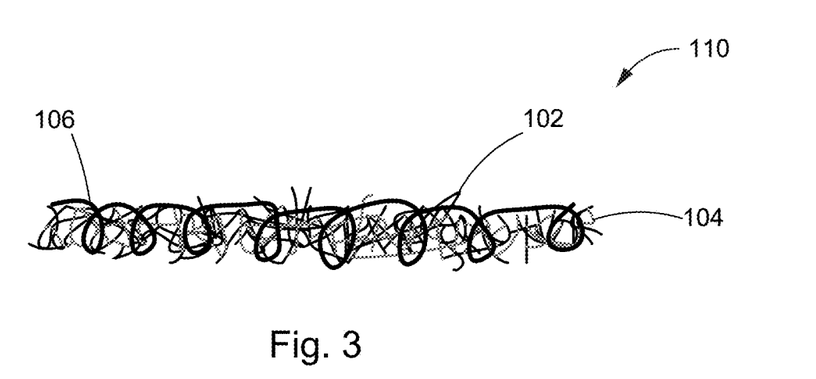
FIG. 3 is a cross section of randomly oriented reinforcing fibers and a thermoplastic fibers of a first thermoplastic and a second thermoplastic, according to one or more embodiments of the present disclosure.

Referring to FIGS. 1-3, the commingling of reinforcing fibers 102 with first thermoplastic fibers 104 and second thermoplastic fibers 106 is shown. The reinforcing fibers 102, the first thermoplastic fibers 104, and the second thermoplastic fibers 106 form an unconsolidated mat 110, as depicted in FIG. 3. In other words, in some implementations, the unconsolidated mat 110 includes at least the reinforcing fibers 102, the first plurality of thermoplastic fibers 104, and the second plurality of thermoplastic fibers 106. However, in other implementations, the unconsolidated mat 110 includes only the reinforcing fibers 102, the first plurality of thermoplastic fibers 104, and the second plurality of thermoplastic fibers 106. Although depicted as thermoplastic fibers, the mat 110 may include thermoplastic elements other than fibers, such as filaments, powders or pellets.

The reinforcing fibers 102 are randomly oriented fibers depicted as black in FIGS. 1-3. The reinforcing fibers 102 may be made of any composite materials including carbon fibers or other thermoset plastics. The reinforcing fibers 102 may be of varying lengths and diameters. In one example, the reinforcing fibers 102 are between one and ten inches long with a uniform diameter. In other examples, the reinforcing fibers 102 are non-uniform in diameter.

The randomly oriented reinforcing fibers 102 as shown in FIG. 1 are commingled with the first thermoplastic fibers 104 as shown in FIG. 2. The commingling may occur as randomly oriented plurality of first thermoplastic fibers 104 are mixed, combined, or otherwise integrated with the reinforcing fibers 102. The first thermoplastic fibers 104 are made of any thermoplastic material composition with a low melting temperature relative to the second thermoplastic material described more fully below. With the melting temperature of the first thermoplastic fibers 104 being below the melting temperature of the second thermoplastic fibers 106, the first thermoplastic fibers 104 will melt at a lower temperature than the second thermoplastic fibers 106.

Referring now to FIG. 3, a second plurality of thermoplastic fibers 106, depicted in a heavier line, is commingled with the first thermoplastic fibers 104 and the reinforcing fibers 102. The relative quantity or volume of the second thermoplastic fibers 106 is less than the relative quantity or volume of the second thermoplastic fibers 104. In some embodiments, the second thermoplastic fibers 106 is between one percent and five percent of the total volume. The quantity of the second thermoplastic fibers 106 may be dictated by how well it distributes in the unconsolidated mat 110. In addition, the higher the tensile strength of the second thermoplastic fibers 106, the less material needed to counter the bulking of the first thermoplastic material. That is, the composite fiber-reinforced consolidated sheet will require less quantity of materials with higher tensile strengths. More material may be required with materials with lower tensile strengths.

The relative quantity or volume of the first thermoplastic material is greater than the relative quantity or volume of the second thermoplastic fibers 106. The quantity or volume of the first thermoplastic material will, in some embodiments, need to be sufficient to allow the composite fiber-reinforced consolidated sheet to be pliable and form to the shape of the forming tool during the forming operation. In some embodiments, the first thermoplastic material is between thirty percent and fifty five percent of the total volume. The remaining volume may be the reinforcing fibers 102. In some embodiments, the reinforcing fibers are between forty percent and seventy percent of the total volume.

Various combinations of reinforcing fibers are envisioned within the ranges disclosed herein. In a first example, the unconsolidated mat 110 includes fifty percent of composite fiber by volume, forty eight percent of the first thermoplastic material by volume, and two percent of the second thermoplastic fibers 106 by volume. In a second example, the unconsolidated mat 110 includes fifty percent of composite fiber by volume, forty eight and a half percent of the first thermoplastic material by volume, and one and a half percent of the second thermoplastic fibers 106 by volume. In a third example, the unconsolidated mat 110 includes forty five percent of composite fiber by volume, fifty four percent of the first thermoplastic material by volume, and one percent of the second thermoplastic fibers 106 by volume.

Various thermoplastic materials may be utilized as the first and second thermoplastic. In some embodiments, the first and second thermoplastics are different thermoplastic materials. In some embodiments, the first and second thermoplastics are the same material with different melting temperatures. For example, the first thermoplastic may be a lower melting temperature Polyether ether ketone (PEEK) while the second thermoplastic is a higher melting temperature PEEK.

The thermoplastic materials contemplated in this disclosure include, but is not limited to: Polyamide 6 (PA6)-melting temperature 223° C.; Polycarbonate (PC))-melting temperature 225° C.; Polyethersulfone (PES))-melting temperature 234° C.–377° C.; Polyethylene terphthalate (PET)-melting temperature 265° C.; Polyamide 6,6 (PA6,6)-melting temperature 275° C.; Polyphenylene Sulfide (PPS)-melting temperature 285° C.-320° C.; Polyether ether ketone (PEEK)-melting temperature 334° C.; Polyether ketone ketone (PEKK)-melting temperature 337° C.; or Polyetherimide (PEI)-melting temperature 393° C. The melting temperatures are provided for general reference and not meant to be limiting.

Referring back to FIG. 3, the second thermoplastic fibers 106 may be commingled with the first thermoplastic material and the reinforcing fibers in various manufacturing processes. In some embodiments, the second thermoplastic fibers 106 are needle-punched into the unconsolidated mat 110 to provide even distribution. In some embodiments, the second thermoplastic fibers 106 are stitched into the unconsolidated mat 110 to provide even distribution. In some embodiments, the second thermoplastic fibers 106 are knitted into the unconsolidated mat 110 to provide even distribution.

Figure 4:
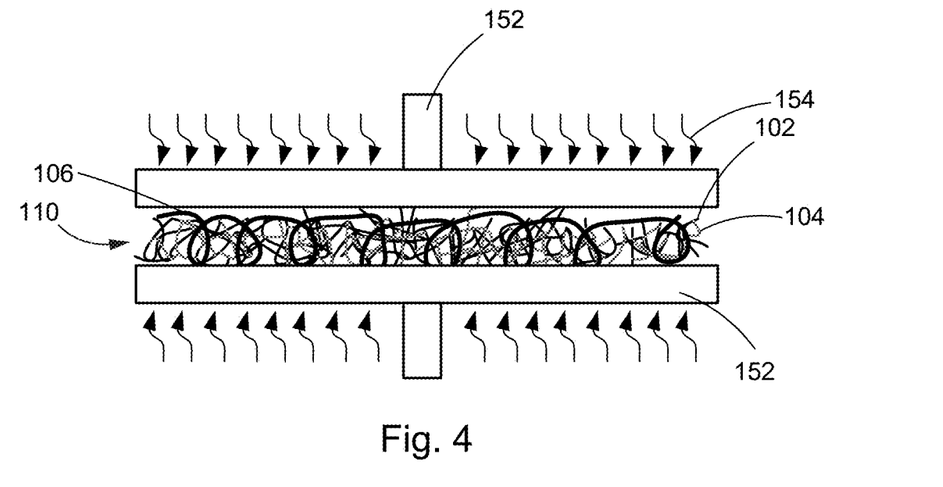
FIG. 4 is a compression tool with an unconsolidated mat being subjected to heat, according to one or more embodiments of the present disclosure.

Referring to FIG. 4, the unconsolidated mat 110 is subjected to heat (represented by arrows 154). The unconsolidated mat 110 is subjected to a first heating temperature that is above the melting temperature of the second thermoplastic fibers 106. That is, the heat source heats the unconsolidated mat 110 to a temperature above both the melting temperature of the first thermoplastic material and the melting temperature of the second thermoplastic fibers 106. At this first heating temperature both the first thermoplastic material and the second thermoplastic fibers 106 are melted and pliable allowing for the formation of a consolidated mat.

Figure 5:
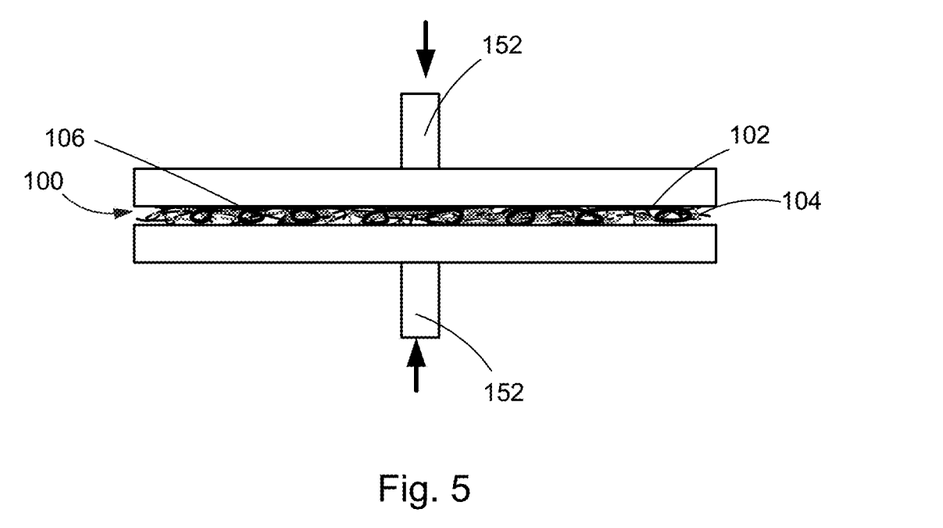
FIG. 5 is a compression tool with a consolidated mat, according to one or more embodiments of the present disclosure.

Referring now to FIG. 5, the unconsolidated mat 110, while heated, is compressed by a compression tool 152. The heat as well as the pressure of the compression tool 152 forms the unconsolidated mat 110 into a composite fiber-reinforced consolidated sheet 100. With the pressure and sufficient heat to melt both the first thermoplastic material and the second thermoplastic fibers 106, the sheet 100 is consolidated mat with reinforcing fibers 102 reinforcing a consolidated mixture of the first thermoplastic material 204 and the second thermoplastic material 206. While described and depicted as a planar sheet for sake of simplicity, the unconsolidated mat 110 may be heated and compressed into other more complex shapes. The sheet 100 is then cooled and a stable composite fiber-reinforced consolidated sheet 100 is produced.

Figure 6:
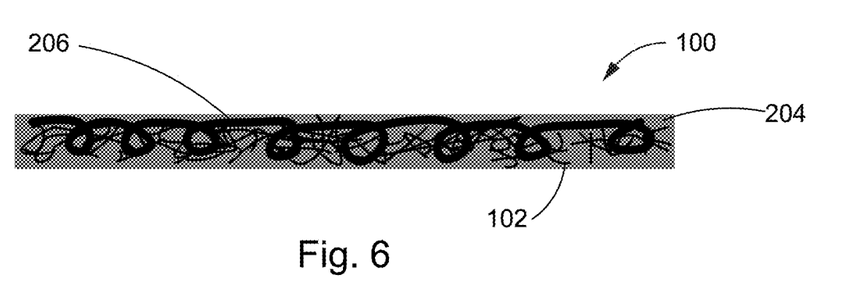
FIG. 6 is a consolidated mat, according to one or more embodiments of the present disclosure.

Referring to FIG. 6, the composite fiber-reinforced consolidated sheet 100 is shown. The composite fiber-reinforced consolidated sheet 100 includes reinforcing fibers 102 distributed throughout the sheet. The composite fiber-reinforced consolidated sheet 100 further includes the first thermoplastic material 204 and the second thermoplastic material 206 distributed throughout the composite fiber-reinforced consolidated sheet 100. A large quantity of composite fiber-reinforced consolidated sheets 100 may be quickly and efficiently manufactured and ready to be utilized in the formation of planar or non-planar parts or structures.

Figure 7:
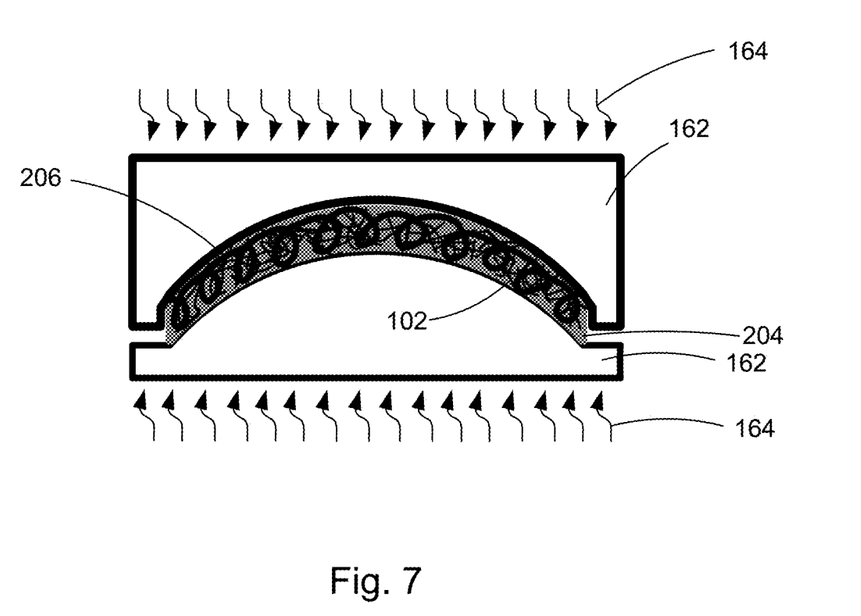
FIG. 7 is a forming tool with a consolidated mat, according to one or more embodiments of the present disclosure.

Referring now to FIG. 7, the composite fiber-reinforced consolidated sheet 100 is reheated (represented by arrows 164). However, in the reheating process, the composite fiber-reinforced consolidated sheet 100 is heated to a second temperature. The second temperature is between the melting temperature of the first thermoplastic material 204 and the melting temperature of the second thermoplastic material 206. That is, the composite fiber-reinforced consolidated sheet 100 is heated to a temperature sufficient to melt or make pliable the first thermoplastic material 204 but is not heated to a temperature sufficient to melt or make pliable the second thermoplastic material 206.

During the reheating process, the first thermoplastic material 204 will become pliable and will respond to the forces and pressures of the forming tool 162 and conform to the non-planar shape of the forming tool 162. In addition, as discussed herein, the first thermoplastic material will be subjected to expansionary forces and will be inclined to bulking at the second reheating temperature. However, as the second thermoplastic material 206 is not heated to a temperature above its melting temperature, the second thermoplastic material 206 will counter or restrict the bulking and expansion of the first thermoplastic material 204. As such, the composite fiber-reinforced consolidated sheet 100 will expand less than what a composite fiber-reinforced consolidated sheet without the second thermoplastic material present would expand.

While reheated to the second temperature, the composite fiber-reinforced consolidated sheet 100 will be compressed, molded, or pressed into a non-planar shape by the forming tool 162. In the illustrated embodiment, the composite fiber-reinforced consolidated sheet 100 is compressed into concave shape. The non-planar shape may be any of a number of complex shapes, which are explicitly discussed but are contemplated herein. The resulting non-planar composite part 200 is then cooled to a stable temperature.

While the forming tool 162 is depicted as forming a single composite fiber-reinforced consolidated sheet 100, in some embodiments, a plurality of composite fiber-reinforced consolidated sheets 100 are stacked and heated to the second temperature and subjected to the forming operation to form sandwich parts and parts thicker than the thickness of a single composite fiber-reinforced consolidated sheet 100.

Figure 8:
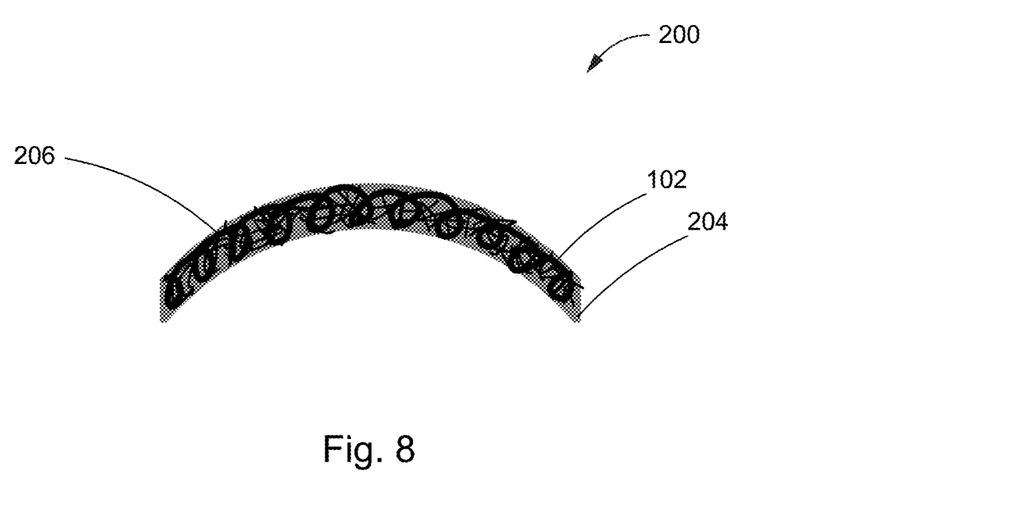
FIG. 8 is a formed non-planar composite part, according to one or more embodiments of the present disclosure.

The resulting non-planar composite part 200 is depicted in FIG. 8. The non-planar composite part 200 includes reinforcing fibers 102 intermixed within a first thermoplastic material 204 and a second thermoplastic material 206. The non-planar composite part 200 may include various ratios of the reinforcing fibers 102, the first thermoplastic material 204, and the second thermoplastic material 206.

In some embodiments, the reinforcing fibers are between forty percent and seventy percent of the part 200 by volume. In some embodiments, the first thermoplastic material is between thirty percent and fifty five percent of the part 200 by volume. In some embodiments, the second thermoplastic material is between one percent and five percent of the part 200 by volume.

Figure 9:
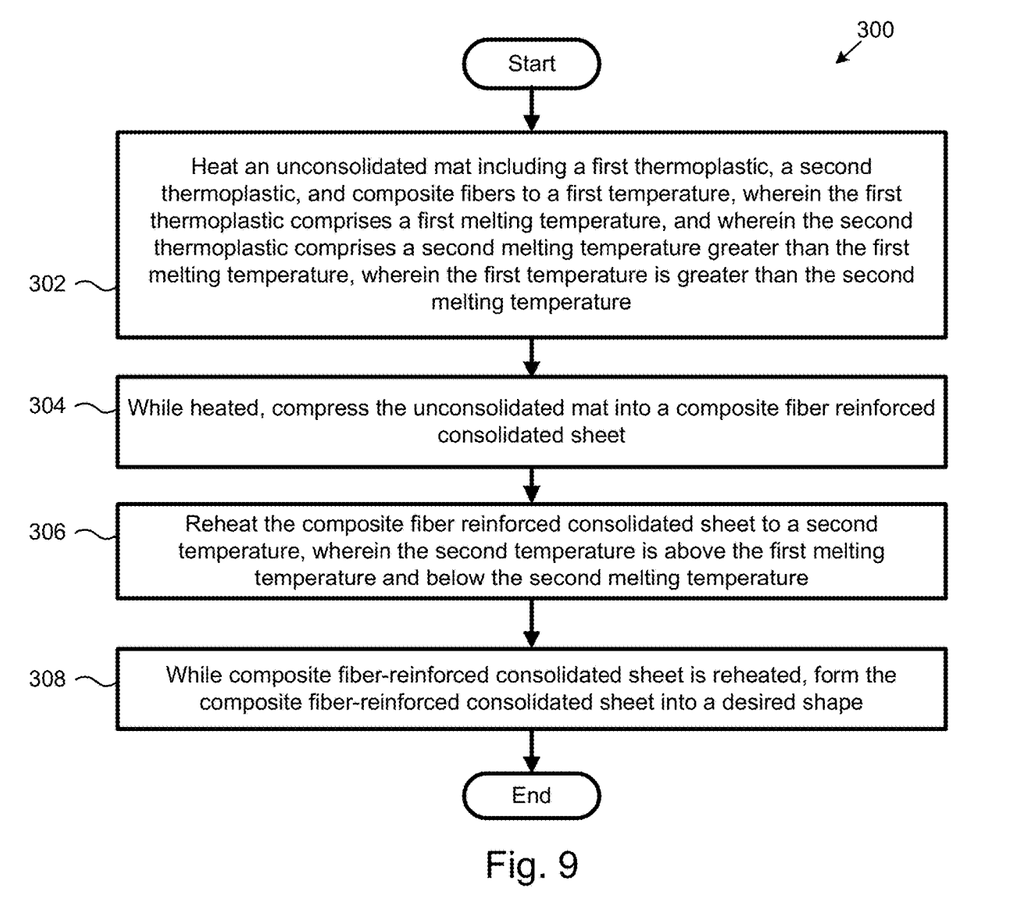
FIG. 9 is a method of forming a composite part, according to one or more embodiments of the present disclosure.

Now referring to FIG. 9, one embodiment of a method 300 of forming a composite part is shown. The method 300 includes heating an unconsolidated mat including a first thermoplastic, a second thermoplastic, and reinforcing fibers to a temperature above the melting temperature of both the first and second thermoplastics at 302 and while heated, compressing the unconsolidated mat into a composite fiber-reinforced consolidated sheet at 304. The first thermoplastic includes a first melting temperature. The second thermoplastic includes a second melting temperature above the first melting temperature. At 306, the method 300 includes reheating the sheet to a second temperature, wherein the second temperature is above the first melting temperature and below the second melting temperature. The method 300 additionally includes while composite fiber-reinforced consolidated sheet is reheated, forming the composite fiber-reinforced consolidated sheet into a desired shape at 308. The method 308 then ends.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagram included herein is generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of forming a composite part, the method comprising:
   heating an unconsolidated mat comprising a first thermoplastic, a second thermoplastic, and reinforcing fibers to a first temperature, wherein the first thermoplastic comprises a first melting temperature, wherein:
      the second thermoplastic comprises a second melting temperature greater than the first melting temperature; and
      the first temperature is greater than the second melting temperature;
   while the unconsolidated mat is heated, compressing the unconsolidated mat into a composite fiber-reinforced consolidated sheet;
   cooling the composite fiber-reinforced consolidated sheet;
   after cooling the composite fiber-reinforced consolidated sheet, reheating the composite fiber-reinforced consolidated sheet to a second temperature, wherein the second temperature is above the first melting temperature and below the second melting temperature; and while composite fiber-reinforced consolidated sheet is reheated, forming the composite fiber-reinforced consolidated sheet into a desired shape.

2. The method according to claim 1, wherein the reinforcing fibers are carbon fibers.

3. The method according to claim 1, wherein the first thermoplastic comprises at least thirty percent of the composite part by volume.

4. The method according to claim 1, wherein the second thermoplastic comprises at least one percent of the composite part by volume.

5. The method according to claim 1, wherein the reinforcing fibers comprise at least forty five percent of the composite part by volume.

6. The method according to claim 1, wherein the first thermoplastic comprises thermoplastic fibers prior to heating the unconsolidated mat.

7. The method according to claim 1, wherein the second thermoplastic comprises thermoplastic fibers prior to heating the unconsolidated mat.

8. The method according to claim 1, wherein the second thermoplastic comprises a thermoplastic powder prior to heating the unconsolidated mat.

9. The method according to claim 1, wherein forming the composite fiber-reinforced consolidated sheet into the composite part comprises a stamp forming operation.

10. The method according to claim 1, wherein:
the first thermoplastic is polyphenylene sulfide (PPS); and
the second thermoplastic is one of polyether ether ketone (PEEK) or polyether ketone ketone (PEKK).

11. The method according to claim 1, wherein the desired shape is a non-planar shape.

12. The method according to claim 1, wherein the second thermoplastic comprises thermoplastic fibers, and wherein the thermoplastic fibers are needle-punched into the first thermoplastic and reinforcing fibers.

13. The method according to claim 1, wherein the second thermoplastic comprises thermoplastic fibers, and wherein the thermoplastic fibers are stitched into the first thermoplastic and reinforcing fibers.

14. The method according to claim 1, wherein the second thermoplastic comprises thermoplastic fibers, and wherein the thermoplastic fibers are knitted into the first thermoplastic and reinforcing fibers.

15. The method according to claim 1, further comprising commingling the reinforcing fibers, the first thermoplastic, and the second thermoplastic in a random orientation to form the unconsolidated mat prior to heating the unconsolidated mat.

16. The method according to claim 1, wherein the first thermoplastic comprises between thirty percent and fifty five percent of the composite part by volume.

17. The method according to claim 1, wherein:
the composite fiber-reinforced consolidated sheet is planar; and
the composite fiber-reinforced consolidated sheet is formed into a non-planar shape.

18. A method of forming a consolidated mat, comprising:
commingling, with a first thermoplastic and reinforcing fibers, a second thermoplastic to form an unconsolidated mat, wherein the first thermoplastic comprises a first melting temperature, and wherein the second thermoplastic comprises a second melting temperature greater than the first melting temperature;
heating the unconsolidated mat to a first temperature, wherein the first temperature is greater than the second melting temperature; and
while the unconsolidated mat is heated, compressing the unconsolidated mat, via a stamp forming operation, into a composite fiber-reinforced consolidated mat;
wherein:
the second thermoplastic comprises thermoplastic fibers; and
the thermoplastic fibers are one of needle-punched, stitched, or knitted into the first thermoplastic and reinforcing fibers.

19. The method according to claim 18, wherein the composite fiber-reinforced consolidated mat comprises a planar sheet.

20. A method of forming a composite part, the method comprising:
heating an unconsolidated mat comprising a first thermoplastic, a second thermoplastic, and reinforcing fibers to a first temperature, wherein the first thermoplastic comprises a first melting temperature, wherein:
the second thermoplastic comprises a second melting temperature greater than the first melting temperature; and
the first temperature is greater than the second melting temperature;
while the unconsolidated mat is heated, compressing the unconsolidated mat into a composite fiber-reinforced consolidated sheet;
reheating the composite fiber-reinforced consolidated sheet to a second temperature, wherein the second temperature is above the first melting temperature and below the second melting temperature; and
while composite fiber-reinforced consolidated sheet is reheated, forming the composite fiber-reinforced consolidated sheet into a desired shape;
wherein the second thermoplastic comprise thermoplastic fibers, and wherein the thermoplastic fibers are one of needle-punched, stitched, or knitted into the first thermoplastic and reinforcing fibers.

* * * * *